H. D. MERRILL.
FLOOD GATE.
APPLICATION FILED APR. 19, 1911.
1,013,608.
Patented Jan. 2, 1912.
2 SHEETS—SHEET 1.
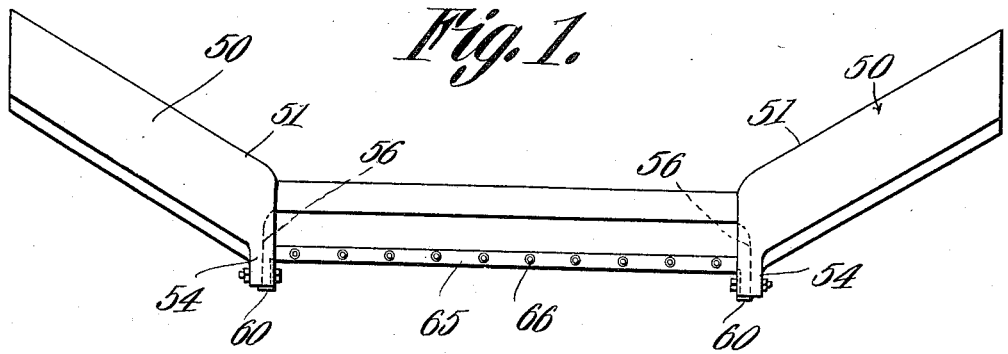
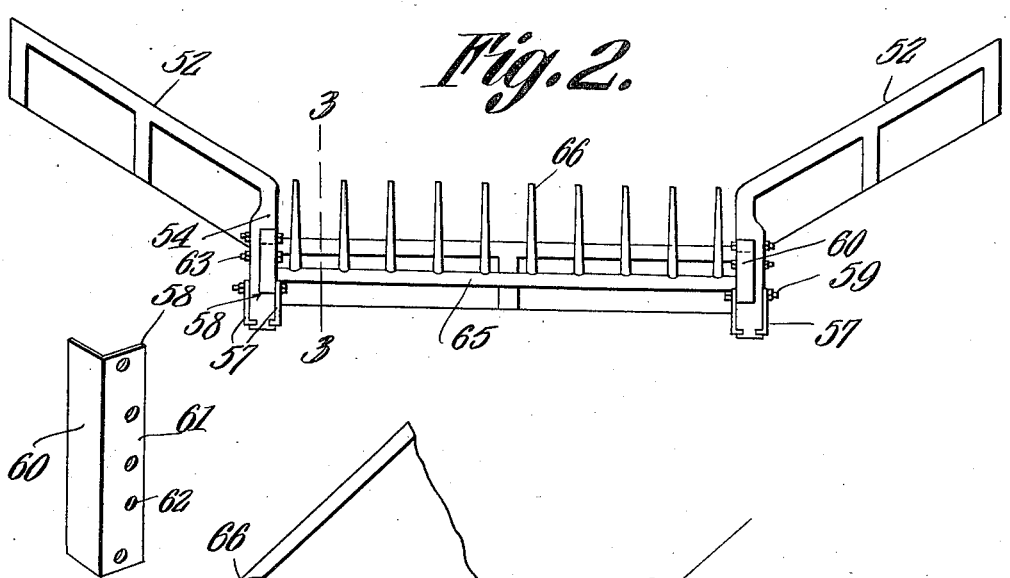
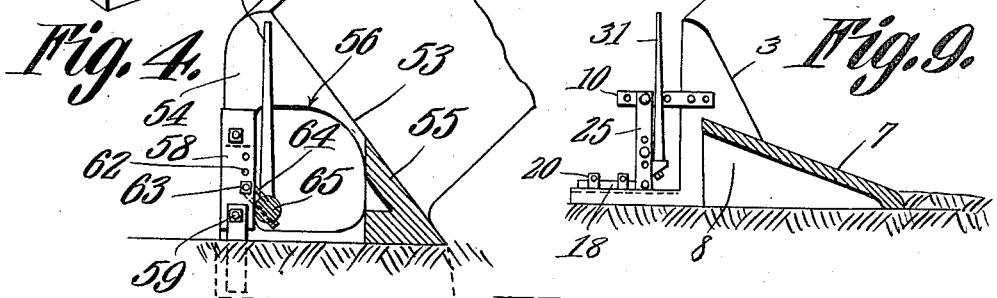
Henry D. Merrill
Inventor,
by C. A. Snow & Co.
Attorneys.
Witnesses

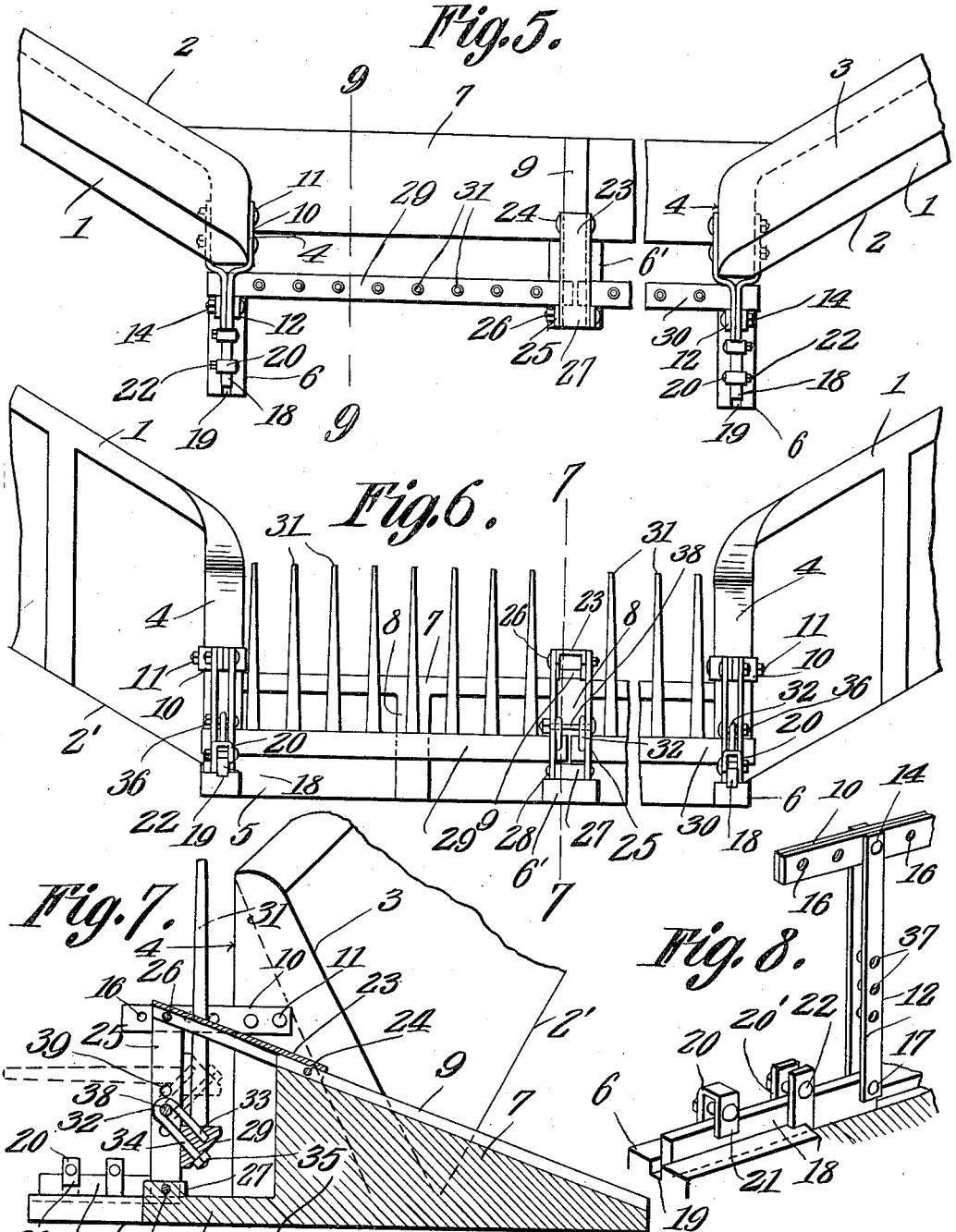

UNITED STATES PATENT OFFICE.

HENRY D. MERRILL, OF CLINTON, MISSOURI.

FLOOD-GATE.

1,013,608.     Specification of Letters Patent.     Patented Jan. 2, 1912.

Application filed April 19, 1911. Serial No. 622,147.

*To all whom it may concern:*

Be it known that I, HENRY D. MERRILL, a citizen of the United States, residing at Clinton, in the county of Henry and State of Missouri, have invented a new and useful Flood-Gate, of which the following is a specification.

It is the object of this invention to provide a novel form of barrier, with which a flood gate may be connected.

Another object of the invention is to provide a novel form of flood gate, and to provide novel means for connecting the flood gate with the barrier.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in top plan; Fig. 2 is an elevation of the structure, looking up-stream; Fig. 3 is a section on the line 3—3 of Fig. 2; Fig. 4 is a perspective of one of the posts; Fig. 5 is a top plan showing a modified form of the invention; Fig. 6 is a front elevation of the structure shown in Fig. 5; Fig. 7 is a transverse section on the line 7—7 of Fig. 6; Fig. 8 is a perspective showing certain of the means whereby the panel is adjustably held in place; and Fig. 9 is a section on the line 9—9 of Fig. 5.

Referring to that form of the invention which is shown in Figs. 1, 2 and 3, wing walls 50 are shown, the wing walls being inclined up-stream, as shown at 51, and being vertically inclined, as shown at 52, to ascend the banks of the stream, the wing walls 50 having an up-stream batter, as shown at 53. The adjacent ends 54 of the wing walls 50 extend down-stream, in parallel relation to each other, and substantially parallel to the thread of the stream. The wing walls are connected by an inclined apron 55, supported upon pillars 67. In the ends 54 of the wing walls 50, in the faces of the said ends 54 which are disposed toward the center of the stream, recesses 56 are formed. Supports 57 are embedded at their lower ends in concrete, or otherwise secured, and to these supports 57, posts 58 are pivoted, as shown at 59. The posts 58 preferably, although not necessarily, are angle members, and one flange 60 of each of the angle members, effectually closes the down-stream side of the recess 56, thus cutting off the current, which would deposit trash in the recesses, such trash interfering with the operation of the flood gate or panel, to be described hereinafter. In the other flanges 61 of the posts 58, there are a plurality of openings 62, adapted to receive bolts 63, certain of which are extended through the portions 54 of the wing walls 50, so as to anchor the posts 58 firmly in an upright position. Certain of the bolts 63 which are engaged in the holes 62, serve as pivotal mountings for U-bolts 64, the U-bolts 64 being extended at an angle of 45°, downwardly, as shown in Fig. 4, to the sill 65 of the panel, the sill 65 carrying a plurality of upstanding pickets 66. The description of the U-bolts 64 and their connections with the sill 65, will be better understood, when a description of a modified form of the invention, hereinafter set forth, is referred to.

It is to be understood that the wing walls 50 and the apron 55 are preferably fashioned from concrete; these portions of the structure being embedded in the earth, to any desired extent. The weight of the panel, comprising the sill 65 and the pickets 60, is disposed off center, owing to the inclination of the U-bolts 64. The pickets 66 therefore stand erect when the water is at its usual height, or below its usual height. A rise in the water in the stream floats the sill 65, whereupon the pickets will recline to a horizontal position. When the water recedes, the pickets 66 will automatically return to their former upright positions.

By removing certain of the bolts 63, whereby the posts 58 are secured to the portions 54 of the wing walls 50, the posts may readily be turned or laid down into a horizontal position, thus permitting the convenient removal of decayed or broken panels, and the installation of new panels, to replace the broken ones.

The concrete apron 55 is supported at any desired height by the pillars 67, the apron 55 protecting the pickets 66 of the panel from coming into contact with drifting debris, carried by the water. The apron 55 also forms a fall of water over its edge, such fall of water preventing sand or other matter from lodging, to prevent the automatic rise and fall of the flood gate panel, as the water in the stream rises and falls. The apron 55 slopes downwardly, and up-stream, and its up-stream edge is embedded in the bed of the stream sufficiently to prevent the water from passing under the apron.

Passing now to that form of the invention which is depicted in Figs. 5, 6, 7, 8 and 9, the barrier is shown as consisting of wing walls 1, inclined up-stream, as shown at 2, and vertically inclined, as shown at 2′, to ascend the banks of the stream, the wing walls 1 having an up-stream batter, as shown at 3. The ends 4 of the wing walls are parallel and extend in the direction of the thread of the stream, the ends 4 being prolonged to form feet 6.

Connected with the wing walls 1, is an inclined apron 7, supported by one or more walls 8. Certain of the walls 8 may be prolonged down-stream, to form a foot 6′ extended transversely of the apron 7, and alined vertically with the wall 8 which is equipped with the foot 6′, and upstanding from the apron 7, is a rib 9, having functions to be described hereinafter.

To both faces of the ends 4 of the wing walls 1, hangers 10 are secured by means of bolts 11 or the like, the hangers 10 converging into union with each other, in front of the ends 4 of the wing walls 1, as clearly seen in Fig. 8. Supported by the hangers 10, are posts, the same being composite structures, and comprising upright plates 12, secured by means of bolts 14, to the hangers 10, there being a plurality of openings 16 in the hangers, in which openings the bolts 14 may be successively mounted. A single bolt 17 unites the lower ends of the plates 12, with slide bars 18, which, if desired, may register in recesses 19, formed in the feet 6, the recesses 19 ordinarily lying parallel to the thread of the stream. Into the feet 6, clamping members, denoted by the numerals 20 and 20′ are inserted. The end 21 of the clamping member 20 overhangs the slide bar 18. The clamping members 20′ which are located nearest to the plates 12, are composed of two bars, set upon either side of the slide bar 18. Bolts 22 extend through the clamping members 20 and 20′, to cause the same to engage with the slide bar 18.

When the stream is of considerable width, provision is made whereby the panel to the flood gate may be formed in sections. Under such circumstances, a channel member 23 is saddled upon the rib 9, the channel member being held upon the rib by means of bolts 24 or other securing elements adapted to a like end. The channel 23 projects forwardly, beyond the lip of the apron 7. A post, comprising plates 25, is shown, the upper ends of the plates 25 being secured by means of bolts 26 to the depending flanges of the channel member 23. The lower ends of the plates 25 extend upon both sides of a lug 27, this lug 27 constituting a part of the foot 6′. Through the lower ends of the plates 25, and through the lug 27, a pivot bolt 28 is passed. The plates 12 at each side of the barrier, and the plates 25 in the intermediate portion of the barrier are, therefore, ordinarily rigidly held, in alinement, transversely of the stream, and in upright positions.

The flood gate may consist of two or more panels, comprising sills 29 and 30, and pickets 31, upstanding from the sills. Through the ends of the sills 29 and 30, U-bolts 32 are passed. The short legs 33 of the U-bolts enter the sills 29 and 30, as shown in Fig. 3, but do not protrude therethrough. The long legs 34 of the U-bolts, protrude through the sills, nuts 35 being applied to the ends of the legs 34 of the U-bolts, in order to hold the U-bolts assembled with the sills 29 and 30. The U-bolts 32, at the remote ends of the sills 29 and 30, are located between the plates 12, while the U-bolts 32 at the adjacent ends of the sills 29 and 30, are located between the plates 25, which are held by the channel member 30, and by the lug 27. Pivot bolts 36, adapted to be mounted successively in openings 37 in the plates 12, are passed through the U-bolts 32 which are at the remote ends of the sills 29 and 30, another pivot bolt, denoted by the numeral 38 and adapted to be inserted successively in openings 39 in the plates 25, constitutes a pivotal mounting for the U-bolts 32 which are at the adjacent ends of the sills 29 and 30. The bolts 32 engage the sills 29 and 30, at an angle of approximately 45° to the pickets 31 the construction, therefore, being such that the centers of gravity of the panels of the flood gate will be disposed up-stream from the centers of suspension of the panels, the panels therefore normally standing in the upright position shown in Fig. 3.

In fashioning the sills 29 and 30, which go to make up the panels of the flood gate, it is the ordinary custom to employ a log of considerable length, and under such circumstances, the log will vary in diameter at its ends. Under such circumstances, if the small ends of the logs are disposed adjacent the parallel ends of the wing walls 1, it will be seen that the smaller ends of the logs may be spaced at considerable distance from the ends 4 of the wing walls, while the butt ends of the logs, being disposed adjacent the rib 9, will rest relatively close to the barrier. If the ends of the sills 29 and 30 are spaced apart from the parallel ends 4 of the wing walls 1, an opportunity will be afforded for swine and other small stock, to pass around the ends of the panels of the flood gate, adjacent the ends 4 of the wing walls 1. In order to obviate this difficulty, the bolts 22 may be loosened, slacking away the clamping members 20 and 20', permitting the slide bars 18 to be advanced up-stream, carrying with them the post plates 12, and moving the remote ends of the sills 29 and 30, relatively near to the parallel ends 4 of the wing walls 1, thereby effectively closing the spaces between the remote ends of the sills 29 and 30, and the ends of the wing walls. Likewise, by mounting the bolts which carry the U-members 32, successively in the openings 37 and 39, of the plates 12 and 25, respectively, the panels of the flood gate may be elevated and depressed, as may be desired. It will be understood that the use of two panels is optional, the construction shown being such, however, that a stream of unusual width may be bridged by two panels. However, the number of panels which is employed, may be increased to any desired extent.

It is to be noted that the posts, supporting the panels, and comprising the plates 12 and the plates 25, are pivotally supported at their lower ends. By setting free the upper ends of these posts, the said upper ends may be swung outwardly, away from the barrier, whereby a broken or decayed panel may readily be replaced by another panel.

Each panel is composed of sills, and pickets, these panels, through the medium of the U-bolts 32, being hung upon the pivot bolt 38, the sill being the most heavy portion of the panel, and serving to hold the pickets erect, when the water is at its usual height, or below its usual height. When a flood, or a rise of water takes place, the pickets will not stand up with the floating sill, with the current against them, although neither the current of the stream, nor floating logs, nor any other debris, carried by the stream in times of flood, has anything to do with the rise and fall of the panels. Their action is governed by the combination of two natural forces. The first of these forces is the natural tendency of the panel to rise or to float when it becomes submerged in water, and the second of these forces is the natural tendency of the panel to fall by the force of gravity. The force of gravity has no visible effect until the water recedes from the panel, whereupon the weight of the panels will be borne by the pivot bolts, the pickets, being the lighter portion of the panel, being tilted into normal position by the relatively heavy sills.

Having thus described the invention, what is claimed is:—

1. A device of the class described comprising wing walls; posts pivotally supported at their lower ends adjacent the wing walls; means for securing the posts to the wing walls; and a panel pivoted to the posts between the wing walls.

2. A device of the class described comprising wing walls having recesses in their adjacent faces; posts pivotally supported at their lower ends; means for securing the posts to the wing walls, to close the downstream ends of the recesses; a panel having its ends disposed in the recesses; and means for pivotally connecting the panel with the posts.

In testimony that I claim the foregoing as my own, I have hereto affixed my signature in the presence of two witnesses.

HENRY D. MERRILL.

Witnesses:
J. D. CARNEY,
CLARA HART.

Copies of this patent may be obtained for five cents each, by addressing the "Commissioner of Patents, Washington, D. C."